April 21, 1925.  1,534,722
L. L. LEBERMAN ET AL
COMBINED SPINNER AND FLY
Filed Aug. 31, 1922
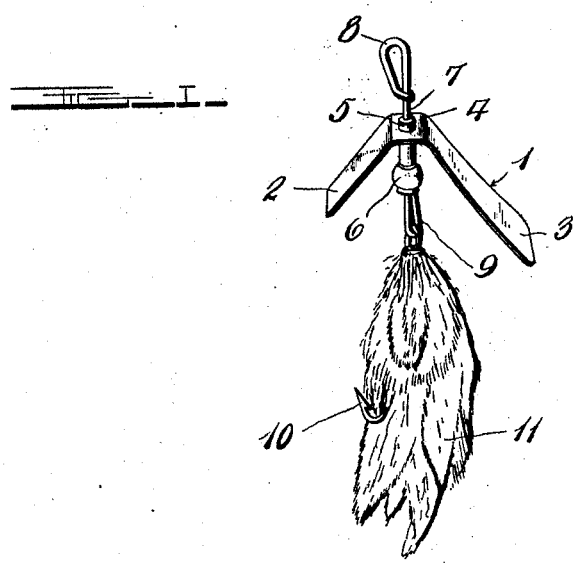
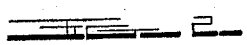
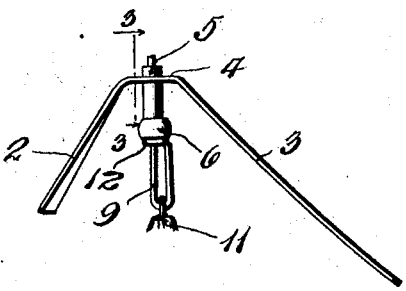
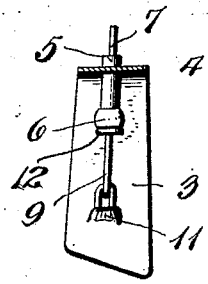
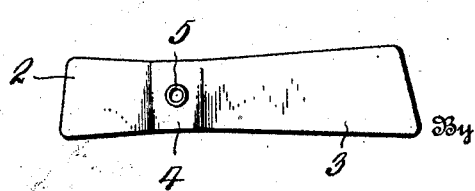
Inventors
Lawrence L. Leberman and
Henry T. Jacobs.
By Donald L. Maxson.
Attorney Patented Apr. 21, 1925.

1,534,722

UNITED STATES PATENT OFFICE.

LAURENCE L. LEBERMAN AND HENRY T. JACOBS, OF MEADVILLE, PENNSYLVANIA.

COMBINED SPINNER AND FLY.

Application filed August 31, 1922. Serial No. 585,372.

*To all whom it may concern:*

Be it known that we, LAURENCE L. LEBERMAN and HENRY T. JACOBS, citizens of the United States, residing at Meadville, in the county of Crawford and State of Pennsylvania, have invented certain new and useful Improvements in Combined Spinners and Flies, of which the following is a specification.

This invention relates to improvements in fishing apparatus, and more especially to a combined spinner and fly.

An object of the invention is to provide a suitable spinner and fly that will be so constructed as to make it approximate the movement of a live bait, when it is pulled through the water.

A further object of the invention is to provide a suitable spinner and fly, that will readily attract the attention of fish in trolling streams or waters.

A still further object of the invention is to provide a suitable spinner and fly which will be highly efficient in use and inexpensive to manufacture.

Other objects will appear as the description proceeds.

In the accompanying drawings which constitute a part of our application,

Figure 1 is a perspective view of the combined spinner and fly;

Figure 2 is a side elevation of the spinner and mounting therefor;

Figure 3 is a vertical sectional view taken on the line 3—3 of Figure 2, and

Figure 4 is a plan view of the spinner.

Like characters of reference are used throughout the following specification and drawings to designate corresponding parts.

The spinner 1 is constructed from metal, and is formed with flat sides 2 and 3, the side 3 being the longer of the two. A flattened surface or face 4 is formed between the sides of the spinner 1, and adjacent the central portion thereof. A bushing or stem 5 is set into the center portion 4 of the spinner 1, and is placed to one side of the center and at an angle to said center portion. The lower end of the stem 5 is mounted to bear on a bead 6, which is carried by the wire or rod 7, which passes through the stem 5. On the opposite ends of the rod 4, are formed the loops 8 and 9, for attaching respectively to the fishing line and the fly. As clearly illustrated in the drawings, the two blades 2 and 3 of the spinner are bent at different angles, which in conjunction with the placing of the stem 5 off center, makes the spinner take a twisting or side-ways movement resembling a live minnow swimming in water.

Attached to the loop 9 is the fly which is formed by placing a plurality of hooks 10 together, and covering them with the feathers 11, permitting only a portion of the hooks to be exposed. The lower loop 9 is provided with a portion 12, upon which the bead bearing 6 is adapted to seat.

From the foregoing description, it will be seen that the spinner is provided with two blades, one longer than the other, and with a stem which is set off center to permit the spinner to make a twisting motion. Also, the pitch or angle of the blades is different, so that this also aids in the twisting motion of the spinner.

It will be apparent that many minor changes in detail of construction may be resorted to without departure from the spirit of the invention.

Having thus described our invention what we claim as new and desire to secure by Letters Patent of the United States is:

1. A combined spinner and fly comprising a central portion, a pair of arms formed integrally therewith, one of said arms being longer than the other, said arms being of different pitch, and a stem inclined to the plane of said central portion extending through the same.

2. A combined spinner and fly comprising a central portion, a pair of blades formed integrally therewith, one of said blades being longer than the other, said arms being bent at a different pitch, a stem passing through said central portion and inclined to the plane thereof, a rod or wire passing through said stem, a bead bearing for said stem, and a feathered fly carried by said rod.

3. A combined spinner and fly comprising a central portion, differently pitched arms or blades of different lengths formed integrally therewith, and a bearing stem inclined to the plane of said central portion extending through the same.

In testimony whereof we affix our signatures.

LAURENCE L. LEBERMAN.
HENRY T. JACOBS.